United States Patent
Nagata et al.

(10) Patent No.: US 9,801,084 B2
(45) Date of Patent: Oct. 24, 2017

(54) COMMUNICATION SYSTEM, BASE STATION APPARATUS, MOBILE TERMINAL APPARATUS AND COMMUNICATION METHOD

(71) Applicant: NTT DOCOMO, INC., Tokyo (JP)

(72) Inventors: Satoshi Nagata, Tokyo (JP); Yoshihisa Kishiyama, Tokyo (JP); Kazuaki Takeda, Tokyo (JP); Hideaki Takahashi, Tokyo (JP); Sadayuki Abeta, Tokyo (JP); Takehiro Nakamura, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 14/417,615

(22) PCT Filed: Jun. 12, 2013

(86) PCT No.: PCT/JP2013/066153
§ 371 (c)(1),
(2) Date: Jan. 27, 2015

(87) PCT Pub. No.: WO2014/020997
PCT Pub. Date: Feb. 6, 2014

(65) Prior Publication Data
US 2015/0172940 A1 Jun. 18, 2015

(30) Foreign Application Priority Data
Jul. 31, 2012 (JP) .................................. 2012-170257

(51) Int. Cl.
*H04J 1/16* (2006.01)
*H04W 4/00* (2009.01)
(Continued)

(52) U.S. Cl.
CPC ......... *H04W 24/08* (2013.01); *H04L 27/2613* (2013.01); *H04W 4/06* (2013.01);
(Continued)

(58) Field of Classification Search
CPC ...... H04B 7/024; H04W 52/40; H04W 52/50; H04W 52/242; H04W 24/02; H04W 36/0061; H04W 36/0083
See application file for complete search history.

(56) References Cited

U.S. PATENT DOCUMENTS

2011/0294527 A1* 12/2011 Brueck ................. H04W 24/02
455/466
2011/0300807 A1* 12/2011 Kwun ................... H04W 24/10
455/63.1
(Continued)

FOREIGN PATENT DOCUMENTS

WO 2011/115421 A2 9/2011
WO 2012/067006 A1 5/2012

OTHER PUBLICATIONS

3GPP LTE; Evolved Universal Terrestrial Radio Access (E-UTRA); Physical channels and modulation (3GPP TS 36.211 version 10.0.0 Release 10), 2011.*
(Continued)

*Primary Examiner* — Melanie Jagannathan
(74) *Attorney, Agent, or Firm* — Osha Liang LLP

(57) ABSTRACT

The present invention is designed to provide highly efficient small cell radio access. In a communication system to include a macro station (30), a local station (20), and a mobile terminal apparatus (10), the local station (20) generates measurement signals that are used in measurements in the mobile terminal apparatus (10) based on user an identifier or a user group identifier, and transmits this signal to the mobile terminal apparatus (10). The mobile terminal apparatus (10) receives the measurement signals transmitted from the local station (20) and carries out with measurements with respect to the measurement signals based on the user identifier or the user group identifier.

5 Claims, 6 Drawing Sheets

(51) Int. Cl.
H04W 24/08 (2009.01)
H04W 4/06 (2009.01)
H04W 56/00 (2009.01)
H04W 72/04 (2009.01)
H04L 27/26 (2006.01)
H04W 16/32 (2009.01)
H04W 48/16 (2009.01)
H04W 84/04 (2009.01)
H04W 88/06 (2009.01)
H04W 88/08 (2009.01)

(52) U.S. Cl.
CPC ..... *H04W 56/001* (2013.01); *H04W 72/0446* (2013.01); *H04W 16/32* (2013.01); *H04W 48/16* (2013.01); *H04W 84/045* (2013.01); *H04W 88/06* (2013.01); *H04W 88/08* (2013.01)

(56) References Cited

U.S. PATENT DOCUMENTS

| | | | | |
|---|---|---|---|---|
| 2012/0213109 A1* | 8/2012 | Xu | ......................... | H04B 7/024 370/252 |
| 2012/0287875 A1* | 11/2012 | Kim | ................... | H04W 76/046 370/329 |
| 2013/0021929 A1* | 1/2013 | Kim | ....................... | H04B 7/024 370/252 |
| 2013/0079048 A1* | 3/2013 | Cai | ....................... | H04W 48/16 455/517 |
| 2013/0281090 A1* | 10/2013 | Maeda | .................. | H04W 48/02 455/434 |
| 2013/0301445 A1 | 11/2013 | Abe et al. | | |

OTHER PUBLICATIONS

International Search Report for corresponding International Application No. PCT/JP2013/066153, dated Sep. 3, 2013 (1 page).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).
Extended Search Report issued in corresponding European Application No. 13825349.7, dated May 9, 2016 (19 pages).
Partial Supplementary Search Report issued in corresponding European Application No. 13825349.7, dated Dec. 4, 2015 (9 pages).
Office Action issued in corresponding Japanese Application No. 2012-170257, dated Oct. 4, 2016 (5 pages).
Sharp; "UL-CoMP Rel-11 Proposed Enhancements"; 3GPP TSG RAN WG1 Meeting #65, R1-111477; Barcelona, Spain; May 9-13, 2011 (4 pages).

* cited by examiner

COMMUNICATION SYSTEM, BASE STATION APPARATUS, MOBILE TERMINAL APPARATUS AND COMMUNICATION METHOD

TECHNICAL FIELD

The present invention relates to a communication system, a base station apparatus, a mobile terminal apparatus and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE (referred to as, for example, "LTE-advanced" or "LTE enhancement" (hereinafter referred to as "LTE-A")) are under study for the purpose of achieving further broadbandization and increased speed beyond LTE. In Rel-10, which is one variation of LTE-A, an agreement has been reached to employ carrier aggregation, whereby a plurality of component carriers (CCs), in which the system band of the LTE system is one unit, are grouped to achieve broadbandization. With LTE-A of Rel-10 and later versions, achieving increased capacity by means of a heterogeneous network (HetNet) configuration, in which many small cells are overlaid in a macro cell, is under study.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, in cellular systems such as W-CDMA, LTE (Rel. 8) and successor systems of LTE (for example, Rel. 9 and Rel. 10), the radio communication schemes (radio interface) are designed to support macro cells. In addition to cellular environments such as these, it is expected that, in the future, high-speed wireless services by means of near-field communication such as ones provided indoors, in shopping malls and so on will be provided. Consequently, there is a demand to design a new radio communication scheme that is specially customized for small cells, so that it is possible to secure capacity with small cells while securing coverage with macro cells.

The present invention has been made in view of the above, and it is therefore an object of the present invention to provide a communication system, a base station apparatus, a mobile terminal apparatus and a communication method which can provide highly efficient small cell radio access.

Solution to Problem

The communication system of the present invention provides a communication system having a macro base station apparatus that forms a macro cell, a plurality of local base station apparatuses that are connected with the macro base station apparatus via a communication link and that form small cells in the macro cell, and a mobile terminal apparatus that can communicate with the macro base station apparatus using a radio communication scheme for the macro cell, and that can communicate with each local base station apparatus using a radio communication scheme for the small cells, and in this communication system, the local base station apparatuses has a generating section that generates measurement signals that are used in measurements in the mobile terminal apparatus, based on user identifiers or user group identifiers and a transmission section that transmits the generated measurement signals to the mobile terminal apparatus, and, the mobile terminal apparatus has a receiving section that receives the measurement signals transmitted from the local base station apparatuses and a measurement section that measures the measurement signals based on the user identifiers or the user group identifiers.

Technical Advantage of the Invention

According to the present invention, it is possible to provide highly efficient small cell radio access that is specially customized for small cells.

DESCRIPTION OF EMBODIMENTS

Figure 1:
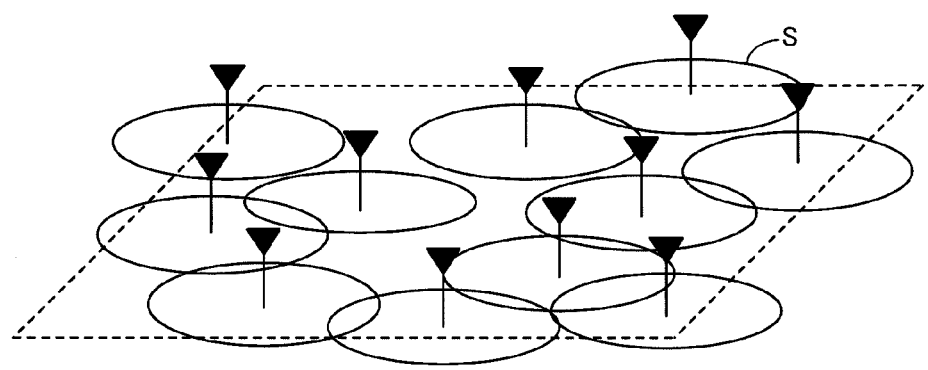
FIG. 1 is a diagram to show a configuration to place many small cells in a macro cell.

As shown in FIG. 1, although, in a heterogeneous network configuration, many small cells are placed in a macro cell area, when many small cells S are placed in a macro cell area, it is necessary to design the small cells S taking into account capacity versus network costs. Network costs may include, for example, the cost of installing network nodes, backhaul links and so on, the operation cost for cell planning and maintenance support, the power consumption on the network side, and so on. As a demand apart from capacity, small cells S are required to support saved power consumption on the mobile terminal apparatus side, random cell planning, and so on.

Figure 2A:
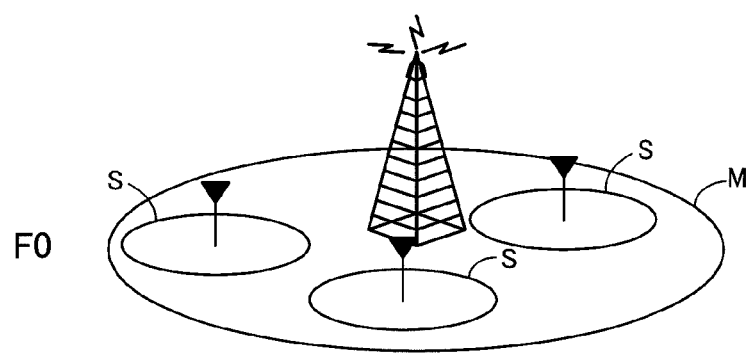
FIG. 2A is a HetNet configuration diagram, in which a macro cell and small cells are operated using the same carrier.
Figure 2B:
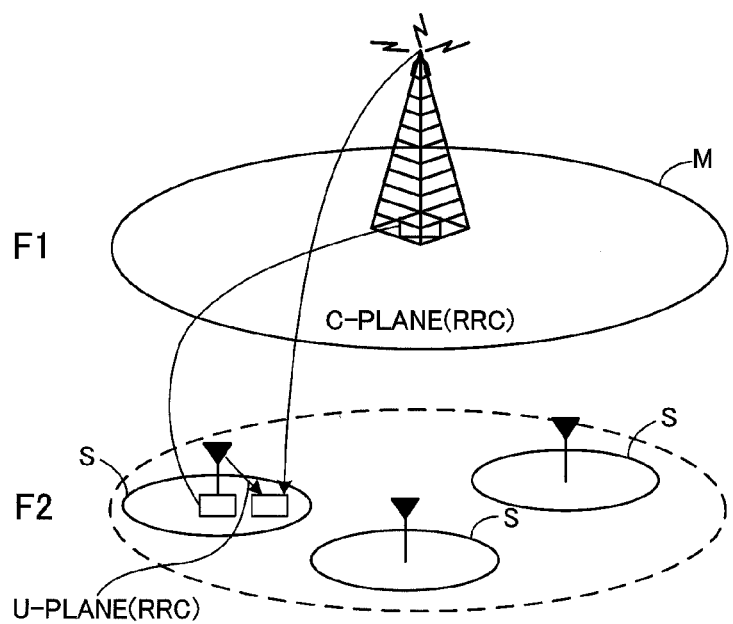
FIG. 2B is a HetNet configuration diagram, in which a macro cell and small cells are operated using different carriers.

The present invention is applicable to the two kinds of heterogeneous networks shown in FIGS. 2A, and 2B.

In the HetNet configuration shown in FIG. 2A, the macro cell M and the small cells S are operated using the same carrier (frequency F0). In the 3GPP, inter-cell interference control (eICIC: enhanced Inter-Cell Interference Coordination) techniques in HetNet have been under study. As a result of this, eICIC in the time domain has been agreed upon. Interference coordination in the time domain (in subframe units) is also applicable to single-carrier communication as well. Interference is reduced by using almost-blank subframes (subframes that do not transmit data) or MBSFN subframes as non-transmission periods.

In the HetNet configuration shown in FIG. 2B, the macro cell M and the small cells S are operated using different frequencies (F1 and F2). To operate the macro cell M and the small cells S with different frequencies (F1 and F2), carrier aggregation defined in LTE-A may be used. In Rel-10, carrier aggregation to group a plurality of component carriers (CCs) for broadbandization, where the system band of the conventional system (LTE) is one unit, is defined. The HetNet configuration shown in FIG. 2B represents a concept to adopt a radio interface (NCT: New Carrier Type) that has no conventional concept of cell IDs and that is specially customized for user data transmission, in small cells S. The HetNet configuration shown in FIG. 2B supports C (Control)-plane to transmit control signals and U (User)-plane to transmit user data, separately, between the macro cell M and the small cells S. In particular, by operating the macro cell M in a conventional LTE frequency band (for example, the 2 GHz band) and the small cells S in a frequency band (for example, the 3.5 GHz band) that is higher than that of the macro cell M, it is possible to maintain high connectivity against the mobility of mobile stations (UEs: User Equipment), and, by using a wide bandwidth, realize high-speed communication that does not produce interference between the macro cells and the small cells. By employing NCT, which removes cell-specific signals (CRSs and so on), many advantages are achieved, such as simplified cell planning, energy saving, flexible application of CoMP (Coordinated Multi-Point) techniques and so on. The macro cell M supports C-plane and U-plane together, and achieves transmission quality even with UEs without nearby small cells.

Now, referring to the HetNet configuration shown in FIG. 2B, there may be differences in requirements and configurations between the macro cell and the small cells. The macro cells have a limited bandwidth, and therefore spectral efficiency is very important. By contrast with this, the small cells can take up a wide bandwidth easily, so that, as long as a wide bandwidth is secured, the importance of spectral efficiency is not as high as it is for the macro cell. While the macro cell needs to support high mobility such as typified by cars, the small cells have only to support low mobility. The macro cell needs to secure a wide coverage. Although the small cells should preferably secure a wide coverage as well, the macro cell can cover up the shortage of coverage.

Although, in the macro cell, there is a significant power difference between the uplink and the downlink and the uplink and the downlink are asymmetrical, in the small cells, there is little power difference between the uplink and the downlink and the uplink and the downlink are made nearly symmetrical. In the macro cell, the number of connecting users per cell is large, and, furthermore, cell planning is executed, so that there is little variation of traffic. In the small cells, the number of connecting users per cell is low, and, furthermore, cell planning may not be executed, and therefore traffic varies significantly. In this way, the optimal requirements for the small cells are different from those of the macro cell, and therefore there is a need to design a radio communication scheme that is specially customized for small cells.

Considering interference that arises from saved power consumption and random cell planning, it is preferable to configure the radio communication scheme for small cells to assume non-transmission while there is no traffic. Consequently, the radio communication scheme for small cells may be designed as UE-specific as possible. Consequently, the radio communication scheme for small cells may be designed based on EPDCCHs (Enhanced Physical Downlink Control Channels) and DM-RSs (Demodulation-Reference Signals), without using the PSS/SSS (Primary Synchronization Signal/Secondary Synchronization Signal), CRSs (Cell-specific Reference Signals) and the PDCCH (Physical Downlink Control Channel) in LTE.

An EPDCCH refers to a predetermined frequency band in the PDSCH region (data signal region) that is used as a PDCCH region (control signal region). EPDCCHs that are allocated to the PDSCH region are demodulated using DM-RSs. An EPDCCH may be referred to as an "FDM-type PDCCH" or may be referred to as a "UE-PDCCH." Although a new carrier frequency that is different from conventional carrier frequencies is used in the radio communication scheme for small cells, this new carrier frequency may be referred to as an "additional carrier," or may be referred to as an "extension carrier."

In a radio communication system to use LTE and so on, a mobile terminal apparatus has to detect cells of good radio quality for the mobile terminal apparatus based on synchronization channels and so on, when the power supply is turned on, during standby, during communication, during intermittent reception while communication is in progress, and so on. This process is referred to as "cell search," meaning a search for a cell to connect a radio link to. The mobile terminal apparatus determines channel states based on downlink reference signals that are placed over the entire system band, and reports the channel states (CSI: Channel State Information) to base stations. In LTE, CQIs (Channel Quality Indicators), PMIs (Precoding Matrix Indicators), and RIs (Rank Indicators) are defined as parameters to be reflected on CSI.

The present inventors have focused on the fact that, in a radio communication scheme for small cells that is designed UE-specific, the measurement signals for cell search for a plurality of small cells, synchronization with small cells, handover between small cells and re-selections of cells, and, furthermore, the measurement signals for detecting channel states in the system band of small cells are important to realize highly efficient small cell radio access that is specially customized for small cells, and arrived at the present invention.

In the following description, the measurement signals for allowing a mobile terminal apparatus to measure the received signal power (RSRP: Reference Signal Received Power), the received quality (RSRQ: Reference Signal Received Quality), and the received signal-to-interference and noise power ratio (RSSI: Received Signal Strength Indicator) of small cells, and the measurement signals for measuring channel states in the system band of the cells (macro cells and small cells) will be collectively referred to as "measurement signals."

Among the measurement signals, the MEASUREMENT signal for cell search for finding small cells will be referred to as the "DISCOVERY SIGNAL." The "DISCOVERY SIGNAL" may be also referred to as the "PDCH (Physical Discovery Channel)," the "BS (Beacon Signal)," and the "DPS (Discovery Pilot Signal)." A base station apparatus that constitutes a macro cell will be referred to as a "macro station," and a base station apparatus that constitutes a small cell will be referred to as a "local station."

According to a first aspect of the present invention, measurement signals that are generated in sequences in local stations based on specifying information are transmitted on the downlink, the specifying information that was used to generate the measurement signals sequences is reported to a mobile terminal apparatus through higher layer signaling or broadcast signals, and the mobile terminal apparatus specifies the measurement signals based on the reported specifying information and measures the RSRP (and/or the RSRQ and the RSSI) or channel states.

By this means, it is possible to generate measurement signals in local stations based on arbitrary specifying information, and, furthermore, since the specifying information, from which the measurement signal sequences are generated, is reported to a mobile terminal apparatus through higher layer signaling or broadcast signals, it is possible to receive and measure even small cell-specific measurement signals in the mobile terminal apparatus.

According to a second aspect of the present invention, measurement signals that are generated in sequences in local stations based on user the IDs assigned to a mobile terminal apparatus or the user group IDs assigned to the groups of the mobile terminal apparatus are transmitted on the downlink, and the mobile terminal apparatus specifies the measurement signals based on the user IDs or the user group IDs of the subject node, and measures the RSRP (and/or the RSRQ and the RSSI) or channel states.

By this means, signal sequences of measurement signals are generated based on user IDs or user group IDs, so that it is possible to generate signal sequences of measurement signals without being limited by cell IDs, compared to signals whose signal sequences are linked with cell IDs. Even when small cell-specific measurement signals are used, the mobile terminal apparatus can specify and measure the measurement signals based on the user IDs or the user group IDs identifying the mobile terminal apparatus.

According to a third aspect of the present invention, small cell synchronization channels are generated as measurement signals for measuring the RSRP (and/or the RSRQ and the RSSI), and measurement signals for measuring channel states are generated based on sequence information of the small cell synchronization channels, and a mobile terminal apparatus specifies the measurement signals for measuring the RSRP (and/or the RSRQ and the RSSI) based on the parameters of the small cell synchronization channels and measures the RSRP (and/or the RSRQ and the RSSI), and specifies the measurement signals for measuring channel states based on sequence information of the small cell synchronization channels and measures channel states.

By this means, the measurement signals for measuring channel states are generated based on sequence information of the small cell synchronization channels, so that it is possible to reduce the signaling of control information related to the measurement signals for measuring channel states.

Signals from following (1) to (4) or arbitrary combinations of these may be used as measurement signals.

(1) The synchronization signals (PSS: Primary Synchronization Signal; and SSS: Secondary Synchronization Signal) defined in LTE-A (Release 10) can be used as measurement signals. The PSS is transmitted in the last symbol in the first slot of subframes 0 and 5, and the SSS is transmitted in the second symbol from the last in the same slots. The PSS is a length-63 Zadoff-Chu sequence and mapped to 73 subcarriers in the center. The SSS is generated based on frequency interleaving of two length-31 m sequences X and Y, and X and Y assume 31 different values (in practice, 31 different shifts are applied to the same m sequence).

(2) Signals that are the same signal sequences as or different signal sequences from the synchronization signals (PSS and SSS) defined in LTE-A (Release 10), and that are multiplexed in different locations along the time/frequency direction can be used as measurement signals. For example, it is possible to use signals that use different scrambling sequences or that are multiplexed in different slots from the PSS and the SSS.

(3) DISCOVERY SIGNALS for small cells may be used as measurement signals. For example, signals that are the same signal sequences as or different signal sequences from the synchronization signals (PSS and SSS) defined in LTE (Release 8), and that have a longer transmission cycle or a greater amount (density) of radio resources per transmission unit than the synchronization signals (PSS and SSS) can be used.

(4) Reference signals that are already defined in LTE or LTE-A (Release 10) (CSI-RS, CRS, DM-RS (also referred to as "UE-specific reference signals"), PRS and SRS) may be used as measurement signals. Alternatively, part of the conventional reference signals may be used as well. For example, a signal that transmits the CRS of one port in a 5-msec cycle may be used.

Next, the first aspect of the present invention will be described in detail. Measurement signals in small cells will be described with reference to FIG. 3.

A macro station 30 and a mobile terminal apparatus 10 are connected via a radio link, and local stations 20 and the mobile terminal apparatus 10 are connected via radio links. The macro station 30 and the local stations 20 are connected via cables (Faber backhauls) or radio links (wireless backhauls). An X2 interface or other interfaces may be used as the interface between the macro station 30 and the local stations 20. Other interfaces may be, as shown in FIG. 2B, an enhanced model of an X2 interface that is designed so that part of the functions follow commands from the macro station. In the following description, a case of employing an enhanced interface, in which part of the functions follow commands from the macro station, will be primarily described.

In the LTE-A system, for the mobile terminal apparatus 10 to start transmitting and receiving the data channel/control channel with the base stations (the macro station 30 or the local stations 20), the following steps take place:

(1) Establishing Synchronization

The mobile terminal apparatus 10 receives synchronization channels transmitted from the base stations, and establishes synchronization with the base stations.

(2) MEASUREMENTS for MEASUREMENT Reports

The mobile terminal apparatus 10 receives broadcast signals transmitted from the base stations, and measures the received signal power from the base stations (MEASUREMENTS). The mobile terminal apparatus 10 measures received signal power with respect to a plurality of cells, and reports the measurement results to the base stations in the form of MEASUREMENT reports.

(3) MEASUREMENTS for CSI Feedback

The mobile terminal apparatus 10 receives user-specific downlink reference signals (CSI-RSs) and measures channel quality (CQIs) (MEASUREMENTS). The mobile terminal apparatus 10 feeds back CSI information (CQIs, PMIs and RIs), comprised of CQIs that are measured from the measurement signals and PMIs and RIs that are determined, to base stations.

(4) Data Channel/Control Channel Transmission

The base stations allocate resources to the data channel/control channel to transmit to the mobile terminal apparatus 10 based on the CSI information, and transmits the data channel/control channel to the mobile terminal apparatus 10.

The measurement signal generation method in the local stations 20 and a case where the mobile terminal apparatus 10 receives measurement signals and measures the RSRP and so on (MEASUREMENTS) will be considered.

Figure 3:
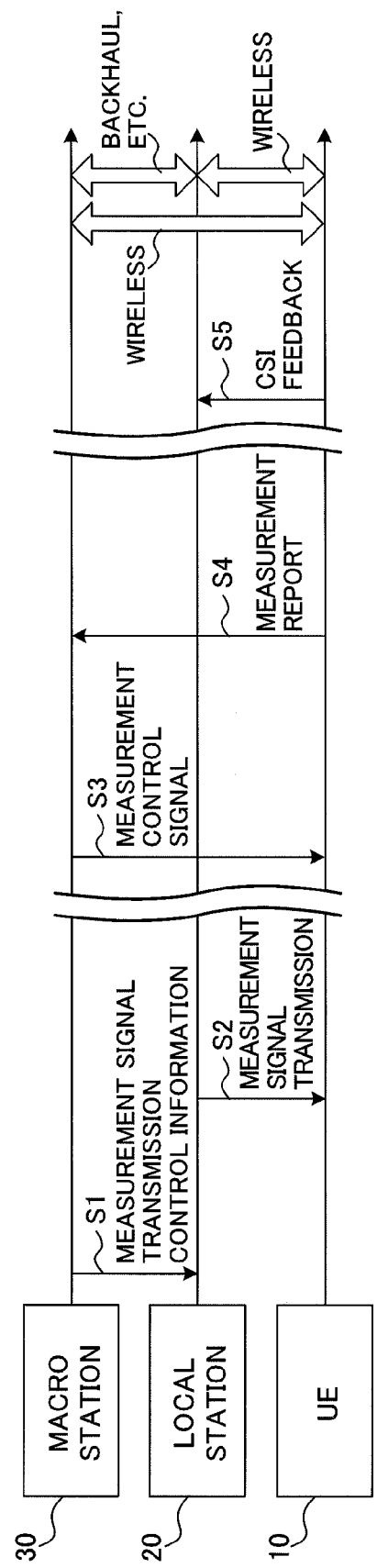
FIG. 3 is a sequence diagram in a communication system according to an embodiment.

As shown in FIG. 3, the macro station 30 determines the parameters of measurement signals transmitted from the local stations 20, and sends control information (transmission control information) for transmitting the measurement signals to the local stations 20 via a backhaul link (step S1). The local stations 20 transmit the measurement signals generated in sequences, based on the transmission control information via the downlink (step S2). The macro station 30 reports control information (measurement control information) for measuring and reporting the measurement signals in a mobile terminal apparatus 10, to the mobile terminal apparatus 10, through higher layer signaling (for example, RRC signaling and broadcast signals) (step S3). The mobile terminal apparatus 10 measures the RSRP and CQIs of the measurement signals transmitted from the local stations 20 based on measurement control information. The mobile terminal apparatus 10 reports the RSRP measurement results of the measurement signals to the macro station 30 as MEASUREMENT reports (step S4). The mobile terminal apparatus 10 measures the CQIs of the measurement signals transmitted from the local stations 20 based on the measurement control information, and acquires CSI information (CQIs, PMIs and RIs). The mobile terminal apparatus 10 feeds back the CSI information determined based on the measurement signals to the local stations 20 or the macro station 30 (step S5).

For example, when signals that are the same as the PSS and the SSS are used as measurement signals, the macro station 30 reports transmission control information for transmitting the PSS and the SSS to the local stations 20 (step S1). The macro station 30 reports the individual signal sequences of the PSS and the SSS to the mobile terminal apparatus 10 as measurement control information, through higher layer signaling. The local stations 20 transmit the same signals as the PSS and the SSS based on the reported transmission control information, as measurement signals. The mobile terminal apparatus 10 specifies the measurement signals based on the signal sequences of the PSS and the SSS and measures the RSRP or CQIs.

Also, when signals that are the same signal sequences as or different signal sequences from the PSS and the SSS, and that are multiplexed in different locations along the time/frequency direction are used as measurement signals, the macro station 30 reports the individual signal sequences of the PSS and the SSS and information about their multiplexing locations along the time/frequency direction, to the local stations 20, as transmission control information. The macro station 30 reports the individual signal sequences of the PSS and the SSS and information about their multiplexing locations along the time/frequency direction, to the mobile terminal apparatus 10, as measurement control information, through higher layer signaling. Based on the transmission control information, the local station 20 generate measurement signals by generating individual signal sequences of the PSS and the SSS and multiplexing these signal sequences in predetermined locations along the time/frequency direction. When the PSS and the SSS are multiplexed in different slots, the slot numbers are reported as measurement control information. The mobile terminal apparatus 10 specifies the measurement signals and measures the RSRP or CQIs based on the slot numbers in which the PSS and the SSS are placed and the signal sequences.

When DISCOVERY SIGNALS for small cells are used as measurement signals, the macro station 30 reports the parameters of the DISCOVERY SIGNALS such as the radio resources, signal sequences, carrier frequencies and bandwidths to the local stations 20 as transmission control information. The macro station reports the parameters of the DISCOVERY SIGNALS such as the radio resources, signal sequences, carrier frequencies and bandwidths to the mobile terminal apparatus 10 as measurement control information through higher layer signaling. The local stations 20 generate DISCOVERY SIGNALS based on the reported transmission control information and transmit them. The mobile terminal apparatus 10 specifies the DISCOVERY SIGNALS based on the parameters of the DISCOVERY SIGNALS such as the radio resources, signal sequences, carrier frequencies and bandwidths, and measures the RSRP or CQIs.

It is equally possible to use reference signals (CSI-RS, DM-RS, CRS, PRS or SRS) that are already defined in LTE or LTE-A as measurement signals. The methods of generating CSI-RS, CRS, DM-RS, PRS or SRS sequences are defined in LTE or LTE-A (3GPP TS 36.211 5.5.3,6.10). Here, the methods of generating CSI-RSs and DM-RSs will be described as examples.

(1) Sequence Information Related to Downlink Reference Signals

In the DM-RS (Demodulation-Reference Signal) or the CSI-RS (Channel State Information-Reference Signal), which are downlink reference signals, pseudo random sequences of the scrambling sequences are defined as follows.

The DM-RS sequence r(m) is defined by following equation 1 (Rel. 10). The pseudo-random sequence c(i) included in this equation 1 is initialized as follows ($C_{init}$). As clear from this initialized pseudo-random sequence $C_{init}$, a term $N_{ID}^{cell}$, which varies depending on cell IDs, is included in the initial pseudo-random sequence $C_{init}$. This pseudo-random sequence c(i) is generated using a length-31 gold sequence. In the initial pseudo-random sequence $C_{init}$, scrambling identification information (SCID) is contained. This SCID assumes the values 0 and 1 (the beginning of each subframe). In this way, the pseudo-random sequence that is used when generating the DM-RS sequence r(m) is configured to vary depending on cell IDs.

[Formula 1]

$$r(m) = \frac{1}{\sqrt{2}}(1 - 2 \cdot c(2m)) + j\frac{1}{\sqrt{2}}(1 - 2 \cdot c(2m + 1)), \quad \text{(Equation 1)}$$

$$m = \begin{cases} 0, 1, \ldots, 12N_{RB}^{max,DL} - 1 & normal cyclic prefix \\ 0, 1, \ldots, 16N_{RB}^{max,DL} - 1 & extended cyclic prefix \end{cases}$$

$$c_{init} = (\lfloor n_s/2 \rfloor + 1) \cdot (2N_{ID}^{cell} + 1) \cdot 2^{16} + n_{SCID}$$

$n_{SCID}$: 0 and 1 (the beginning of each subframe)
$N_{RB}^{PDSCH}$: the bandwidth of applicable PDSCH transmission resource blocks
c(i): the pseudo-random sequence (length-31 gold sequence)

The CSI-RS sequence $r_{1,ns}(m)$ is defined by following equation 2 (Rel. 10). The pseudo-random sequence c(i) included in this equation 2 is initialized as follows ($C_{init}$). As clear from this initial pseudo-random sequence $C_{init}$, a term $N_{ID}^{cell}$, which varies depending on cell IDs, is included in the initial pseudo-random sequence $C_{init}$. In this way, the pseudo-random sequence that is used when generating the CSI-RS sequence $r_{l,n_s}(m)$ is also configured to vary depending on cell IDs.

[Formula 2]

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{(Equation 2)}$$

$$m = 0, 1, \ldots, N_{RB}^{max,DL} - 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$n_S$: the slot number in the radio frame
l: the OFDM symbol number in the slot
$N_{CP}$=0 (for normal CP), $N_{CP}$=1 (for extended CP)

The local stations 20 generate DM-RSs or CSI-RSs based on the above pseudo random sequences or parameters related to these, including parameters related to scrambling identification information (SCID) and cell IDs. Then, the generated DM-RSs or CSI-RSs are transmitted as measurement signals (step S2).

The macro station 30 reports the above pseudo-random sequences or parameters related to these, including parameters related to scrambling identification information (SCID) and cell IDs, to the mobile terminal apparatus 10 as sequence information, by higher layer signaling (step S3). The mobile terminal apparatus 10 specifies the measurement signals based on control information of signal sequences (for example, the CSI-RS scrambling sequence) and so on for receiving the reference signals, and measures the RSRP or CQIs.

Next, the second aspect of the present invent invention will be described in detail. The macro station 30 reports the user identifiers (hereinafter referred to as "user IDs") assigned to mobile terminal apparatuses 10 or the user group IDs assigned to the groups of mobile terminal apparatuses 10, to the local stations 20, via a backhaul link (step S1).

Here, the user IDs defined in LTE will be described in detail. Radio network temporary identifiers (RNTIs) are defined as user IDs. RNTIs are used as UE identifiers in UTRAN and also used when signaling messages between UEs and UTRAN. There are the following four types of RNTIs:
(1) the serving RNC RNTI (s-RNTI), (2) the drift RNC RNTI (d-RNTI), (3) the cell RNTI (c-RNTI), and (4) the UTRAN RNTI (u-RNTI).

For example, the c-RNTI is used so that (1) a user terminal makes itself recognizable to the control RNC, and (2) the control RNC distinguishes between user terminals. Then, the c-RNTI is assigned by the control RNC when the user terminal accesses a new cell. The c-RNTI needs to be specific to the accessed cell.

The second aspect of the present invention is designed such that users IDs (RNTIs) that are assigned when a mobile terminal apparatus accesses new cells and measurement signal parameters are associated (linked) with each other, and the local stations 20 generate measurement signals based on the parameters associated with the user IDs (RNTIs), so that the mobile terminal apparatus 10 is able to estimate the parameters of the measurement signals from the user IDs (RNTIs).

The local stations 20 generate signal sequences of the measurement signals based on the user IDs (or the user group IDs) assigned to the mobile terminal apparatus 10.

For example, when the same signals as the synchronization signals (the PSS and the SSS) are used as measurement signals, signal sequences of the synchronization signals are associated with user IDs (or user group IDs) in advance. The local stations 20 transmit the synchronization signals generated based on signal sequences corresponding to the user IDs (or user group IDs) as measurement signals, on the downlink (step S2). The user IDs (or the user group IDs) are reported from the macro station 30 to the mobile terminal apparatus 10 upon accessing the macro cell. When the synchronization signals (the PSS and the SSS) are used as measurement signals and the measurement signals (synchronization signals) are transmitted from the local stations 20, the mobile terminal apparatus 10 recognizes sequence information of the measurement signals (synchronization signals) from the user IDs (or the user group IDs), and measures the RSRP or CQIs of the measurement signals based on the sequence information.

When signals that are the same signal sequences as or different signal sequences from the synchronization signals (the PSS and the SSS) and that are multiplexed in different locations along the time/frequency direction are used as measurement signals, the signal sequences of the synchronization signals and information about their multiplexing locations along the time/frequency direction, and user IDs (or user group IDs) are linked with each other in advance. Alternatively, it is equally possible to link the multiplexing locations of the PSS and the SSS and user IDs (or user group IDs) with each other. The local stations 20 transmit the measurement signals generated based on the signal sequences and multiplexing location information corresponding to the user IDs (or user group IDs), on the downlink (step S2). When synchronization signals (PSS and SSS) that are multiplexed in different locations from the locations where the synchronization signals (PSS and SSS) should originally be multiplexed are used as measurement signals and the measurement signals (synchronization signals) are transmitted from the local stations 20, the mobile terminal apparatus 10 recognizes the sequence information and the multiplexing locations (slot numbers) of the measurement signals based on the user IDs (or the user group IDs), and measures the RSRP or CQIs of the measurement signals based on the recognized sequence information and multiplexing locations (slot numbers).

When small cell DISCOVERY SIGNALS are used as measurement signals, the parameters of the DISCOVERY SIGNALS such as the radio resources, signal sequences, carrier frequencies and bandwidths are reported to the local stations 20, as transmission control information, via a backhaul link (step S1). The DISCOVERY SIGNALS are set based on signal sequences that are the same as or different from the synchronization signals (PSS and SSS), set to have a longer transmission cycle than the synchronization signals, and set to have a greater amount of radio resources per transmission unit than the synchronization signals. These parameters are included in transmission control information. The parameters of the DISCOVERY SIGNALS such as the radio resources, signal sequences, carrier frequencies and bandwidths are linked with user IDs (or user group IDs).

The local stations 20 generate DISCOVERY SIGNALS as measurement signals based on transmission control information. For example, the local stations 20 generate signal sequences that are the same as or different from the synchronization signals (PSS and SSS), and generate DISCOV- ERY SIGNALS having a longer transmission cycle than the synchronization signals and having a greater amount of radio resources per transmission unit than the synchronization signals. The local stations 20 transmit the generated DISCOVERY SIGNALS on the downlink, in accordance with the transmission cycle (step S2).

The mobile terminal apparatus 10 recognizes the parameters of the DISCOVERY SIGNALS (the radio resources, signal sequences, carrier frequencies, bandwidths, transmission cycles and so on) linked with the user IDs (or the user group IDs), and, based on the recognized parameters, specifies the DISCOVERY SIGNALS and measures the RSRP or CQIs.

As measurement signals, reference signals (CSI-RS, CRS, DM-RS, PRS or SRS) that are already defined in LTE or LTE-A may be used. For example, a case will be considered here where DM-RSs or CSI-RSs, which are downlink reference signals, are used as measurement signals. As noted earlier, the pseudo-random sequence that is used when generating the DM-RS sequence r(m), and the pseudo-random sequence that is used when generating the CSI-RS sequence $r_{1,ns}(m)$ are configured to vary depending on cell IDs.

According to the second aspect of the present invention, the pseudo-random sequences that are used to generate the DM-RS sequence r(m) or the CSI-RS sequence $r_{1,ns}(m)$ are linked with user IDs (or user group IDs), not cell IDs. As with CRSs and PRSs, although a term $N_{ID}^{cell}$ that varies depending on cell IDs is included in the pseudo-random sequence $C_{init}$, this is configured to vary depending on user IDs (or user group IDs), instead of depending on cell IDs.

In the LTE-A (Release 10) system, each local station 20 transmits the CRS using a frequency resource that is defined by applying a predetermined amount of shift in the frequency domain to the frequency resource of the reference signal transmitted from the macro station 30. That is to say, the CRS transmitted from each local station 20 is shifted with respect to the CRS of the macro station 30 along the frequency direction. This amount of shift $V_{shift}$ is determined based on dedicated cell IDs ($V_{shift}$=(cell ID mod 6)).

According to the second aspect of the present invention, the amount of shift $V_{shift}$ for CRSs is linked with user IDs (or user group IDs), not cell-specific cell IDs.

CRSs are transmitted in subframes of all downlink signals, in cells where the PDSCH (Physical Downlink Shard Channel) is transmitted. CRSs are transmitted from one antenna port or a plurality of antenna ports. Consequently, the base stations need to report the number of CRS antenna ports to user terminals UE as cell-specific reference signal information (parameter). The base stations need to report information as to whether or not CRSs are present in subframes (for example, MBSFN configuration) to user terminals UE as cell-specific reference signal information (parameter). In this way, the CRS parameters include the amount of shift $V_{shift}$, the number of antenna ports, and information as to whether or not subframes contain CRSs.

When using DM-RSs or CSI-RSs as a measurement signals, the local stations 20 generate pseudo-random sequences in the DM-RS sequence r(m) and the CSI-RS sequence $r_{1,ns}(m)$ based on user IDs (or user group IDs), and generate the DM-RS sequence r(m) and the CSI-RS sequence $r_{1,ns}(m)$ including the generated pseudo-random sequences as measurement signals.

When using CRSs as measurement signals, the local stations 20 determine the amount of shift $V_{shift}$ based on user IDs (or user group IDs), and generate CRSs by applying the determined amount of shift $V_{shift}$.

When the DM-RS sequence r(m) or the CSI-RS sequence $r_{1,ns}(m)$ is transmitted as a measurement signal, the mobile terminal apparatus 10 specifies the pseudo-random sequence of the DM-RS sequence r(m) or the CSI-RS sequence $r_{1,ns}(m)$ based on the user IDs (or the user group IDs), and, based on the pseudo-random sequence that is specified, measures the RSRP or CQIs of the measurement signal formed with the DM-RS sequence r(m) or the CSI-RS sequence $r_{1,ns}(m)$.

When CRSs are transmitted as measurement signals, the mobile terminal apparatus 10 specifies the multiplexing locations of the CRSs based on the user IDs (or the user group IDs), and, based on the specified multiplexing locations, measures the RSRP or CQIs of the measurement signals formed with CRSs.

Next, the third aspect of the present invention will be described in detail. The local stations 20 use small cell synchronization channels as measurement signals for measuring the RSRP and so on, and use signals that are generated based on sequences determined by the parameters of small cell synchronization channels as measurement signals for measuring CQIs and so on.

To be more specific, it is possible to use small cell-specific DISCOVERY SIGNALS as small cell synchronization channels, and use CSI-RSs as measurement signals for measuring CQIs and so on. The small cell-specific DISCOVERY SIGNALS are defined by parameters such as radio resources, signal sequences, carrier frequencies, bandwidths and so on. CSI-RSs are scrambled by sequences determined by the parameters of the DISCOVERY SIGNALS (radio resources, signal sequences and so on). The local stations 20 transmit the two kinds of measurement signals generated in this way at predetermined times.

The mobile terminal apparatus 10 first receives small cell-specific DISCOVERY SIGNALS and measure the RSRP and so on. Consequently, the mobile terminal apparatus 10 acquires the parameters of the DISCOVERY SIGNALS (radio resources, signal sequences, carrier frequencies, bandwidths and so on) to receive the small cell-specific DISCOVERY SIGNALS. For example, the macro station 30 reports the parameters of the DISCOVERY SIGNALS to the mobile terminal apparatus 10 by higher layer signaling. The mobile terminal apparatus 10 measures the RSRP and so on of the DISCOVERY SIGNALS based on the parameters of the DISCOVERY SIGNALS.

Next, the local stations 20 scramble CSI-RSs with sequences determined by the parameters (for example, signal sequences) of the DISCOVERY SIGNALS. Measurement signals formed with scrambled CSI-RSs are used to measure CQIs and so on.

The mobile terminal apparatus 10 first specifies the CSI-RS signal sequence for measuring CQIs, based on the parameters of the DISCOVERY SIGNALS (for example, the signal sequences) acquired upon the previous measurement of DISCOVERY SIGNALS. That is, it is possible to identify the parameters of measurement signals for measuring CQIs without having these reported from base stations, and therefore reduce signaling. Signals other than CSI-RSs (DM-RSs and so on) are likewise applicable.

Figure 4:
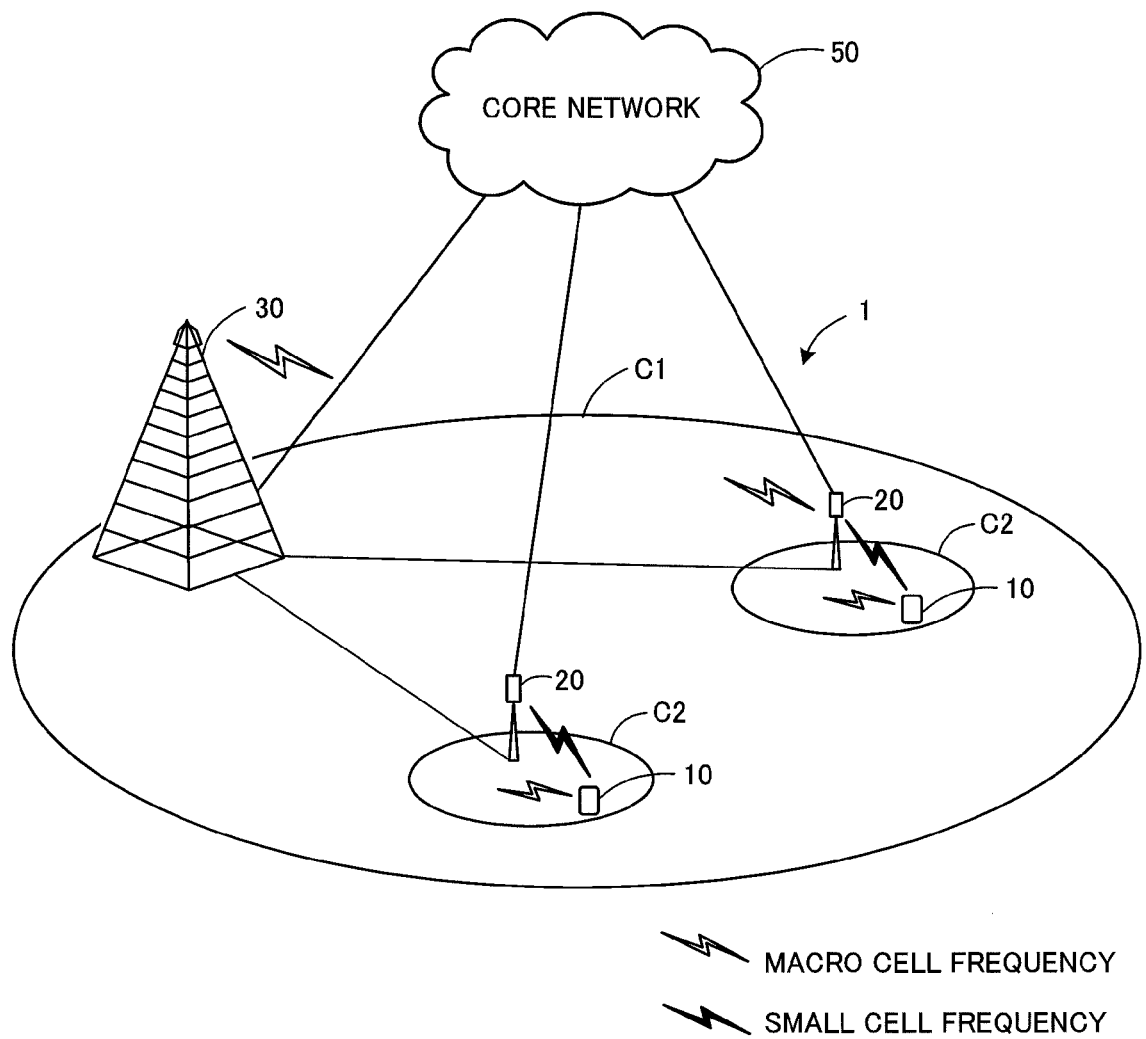
FIG. 4 is a diagram to explain a system configuration of a radio communication system.

Now, the radio communication system according to the present embodiment will be described in detail. FIG. 4 is a diagram to explain a system configuration of a radio communication system according to the present embodiment. The radio communication system shown in FIG. 4 is a system to accommodate, for example, the LTE system or SUPER 3G. This radio communication system supports carrier aggregation, whereby a plurality of fundamental frequency blocks are grouped into one, using the system band of the LTE system as one unit. This radio communication system may be referred to as "IMT-Advanced," or may be referred to as "4G" or "FRA (Future Radio Access)."

As shown in FIG. 4, the radio communication system 1 has a macro station 30 that covers a macro cell C1, and a plurality of local stations 20 that cover a plurality of small cells C2 that are provided in the macro cell C1. Many mobile terminal apparatuses 10 are placed in the macro cell C1 and in each small cell C2. The mobile terminal apparatus 10 supports the radio communication schemes for the macro cell and the small cells, and are configured to be able to perform radio communication with the macro station 30 and the local stations 20.

Communication between the mobile terminal apparatus 10 and the macro station 30 is conducted using a macro cell frequency (for example, a low frequency band). Communication between the mobile terminal apparatus 10 and the local stations 20 is carried out using a small cell frequency (for example, a high frequency band). The macro station 30 and each local station 20 are connected with each other by wire connection or by wireless connection.

The macro station 30 and each local station 20 are connected with a higher station apparatus, which is not illustrated, and are connected to a core network 50 via the higher station apparatus. The higher station apparatus may be, for example, an access gateway apparatus, a radio network controller (RNC), a mobility management entity (MME) and so on, but is by no means limited to these. The local stations 20 may be connected with the higher station apparatus via the macro station 30.

Although each mobile terminal apparatus 10 may be either an LTE terminal or an LTE-A terminal, the following description will be given simply with respect to a mobile terminal apparatus, unless specified otherwise. Although a mobile terminal apparatus will be described to perform radio communication with the macro station 30 and the local stations 20 for ease of explanation, more generally, user equipment (UE), which may cover both mobile terminal apparatuses and fixed terminal apparatuses, may be used as well. The local stations 20 and the macro station 30 may be referred to as transmission points for the macro cell and the small cells. The local stations 20 may be optical remote base station apparatuses.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing, per terminal, the system band into bands formed with one resource block or continuous resource blocks, and allowing a plurality of terminals to use mutually different bands.

Here, communication channels in the LTE system will be described. Downlink communication channels include a PDSCH (Physical Downlink Shared Channel), which is used by each mobile terminal apparatus 10 on a shared basis, and downlink L1/L2 control channels (PDCCH, PCFICH, PHICH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel).

Uplink communication channels include a PUSCH (Physical Uplink Shared Channel), which is used by each mobile terminal apparatus 10 on a shared basis as an uplink data channel, and a PUCCH (Physical Uplink Control Channel), which is an uplink control channel. User data and higher control information are transmitted by this PUSCH. Downlink radio quality information (CQI: Channel Quality Indicator), ACK/NACK and so on are transmitted by the PUCCH.

Figure 5:
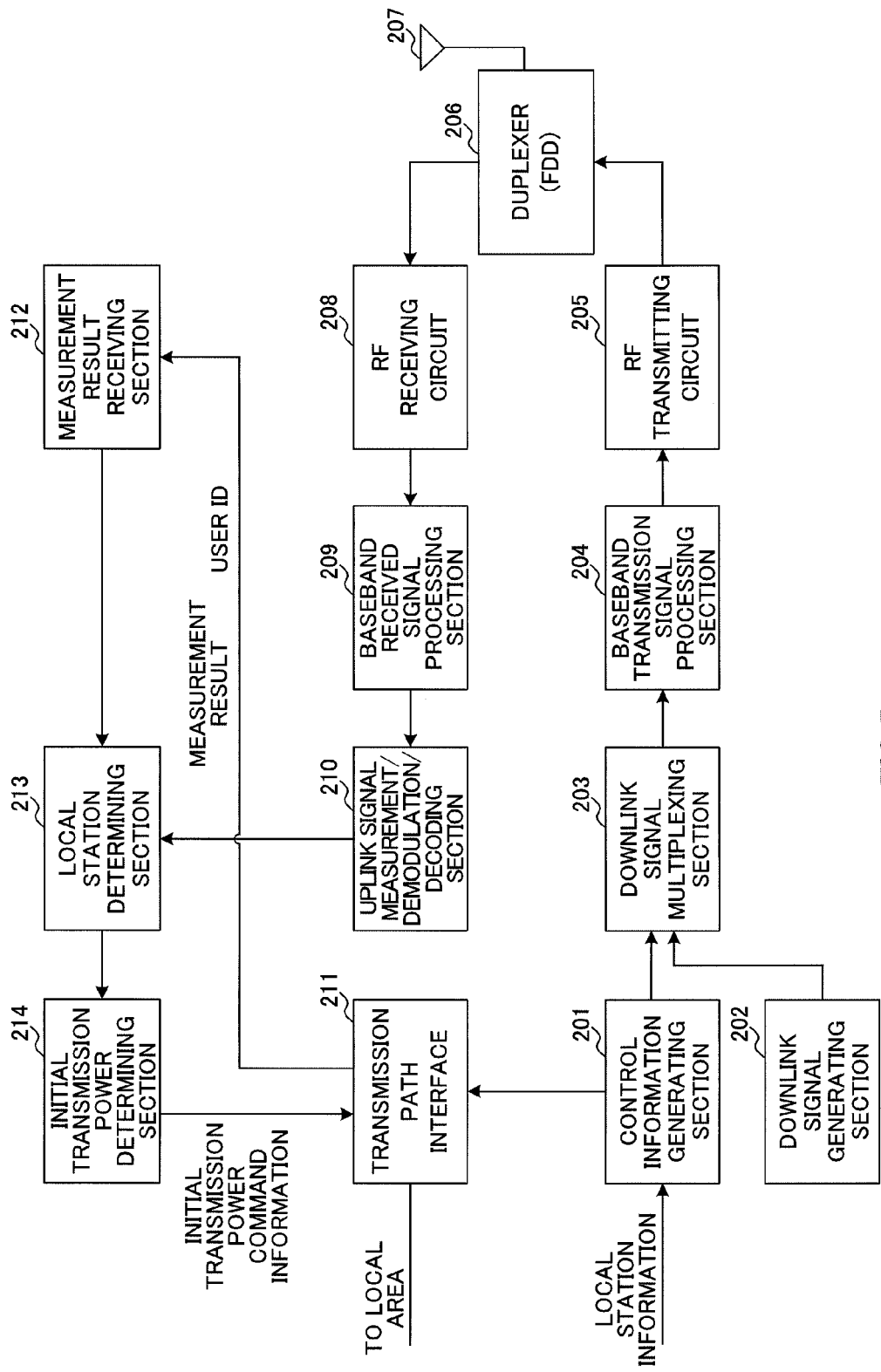
FIG. 5 is a diagram of an overall configuration of a macro station.

An overall configuration of the macro station 30 will be described with reference to FIG. 5. The macro station 30 has, as processing sections of the transmitting sequence, a control information generating section 201, a downlink signal generating section 202, a downlink signal multiplexing section 203, a baseband transmission signal processing section 204, and an RF transmitting circuit 205.

The control information generating section 201 generates transmission control information, which is control information for allowing the local stations 20 to transmit measurement signals, measurement control information for allowing the mobile terminal apparatus 10 to specify and measure the measurement signals, and EPDCCH reception control information. The control information generating section 201 outputs the transmission control information to the transmission path interface 211, and outputs the EPDCCH reception control information to the downlink signal multiplexing section 203. The transmission control information is transmitted to the local stations 20 via the transmission path interface 211. Meanwhile, the measurement control information and the control information for EPDCCH reception are transmitted to the mobile terminal apparatus 10 via the downlink signal multiplexing section 203. Although, when the measurement control information, which is the parameters of the measurement signals, is reported to the mobile terminal apparatus 10 by way of higher layer signaling, the measurement control information is given to the downlink signal multiplexing section 203, this is by no means limiting if the measurement control information is not sent through higher layer signaling, as is the case with the second aspect or the third aspect of the present invention.

The downlink signal generating section 202 generates downlink data signals and reference signals. The downlink signal multiplexing section 203 multiplexes the macro cell control information, and the downlink data signals and downlink reference signals as a macro cell downlink signal. The macro cell downlink signal for the mobile terminal apparatus 10 is input in the baseband transmission signal processing section 204, and subjected to digital signal processing. For example, in the event this is a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 205, and is transmitted from the transmitting/receiving antenna 207 via a duplexer 206 that is provided between the transmitting sequence and the receiving sequence.

The macro station 30 has, as processing sections of the receiving sequence, an RF receiving circuit 208, a baseband received signal processing section 209, an uplink signal demodulation/decoding section 210, a measurement result receiving section 212, a local station determining section 213, and an initial transmission power determining section 214.

An uplink signal from the mobile terminal apparatus 10 is received in the transmitting/receiving antenna 207, and input in the baseband received signal processing section 209 via the duplexer 206 and the RF receiving circuit 208. In the baseband received signal processing section 209, the uplink signal is subjected to digital signal processing. For example, in the event this is an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 210, and decoded (descrambled) and demodulated in the uplink signal demodulation/decoding section 210. The uplink signal demodulation/decoding section 210 decodes the MEASUREMENT reports for measurement signals and CSI information, transmitted from the mobile terminal apparatus 10 as uplink signals, and outputs the results to the local station determining section 213.

The measurement result receiving section 212 receives the MEASUREMENT reports transferred from the local stations 20, and the CSI information fed back to each local station, via the transmission path interface 211. The measurement result receiving section 212 outputs the MEASUREMENT reports for the measurement signals, the user IDs and the CSI information, to the local station determining section 213. When no MEASUREMENT report is transferred from the local stations to the macro station 30, the function of the measurement result receiving section 212 may be omitted.

The local station determining section 213 selects the local stations to feed back CSI information from, based on indicators such as the received signal power of each local station 20 shown in the MEASUREMENT reports of the measurement signals (for example, the small cell DISCOVERY SIGNALS). That is, the local stations to be objects whose CSI information is to be acquired are selected in the mobile terminal apparatus 10. The local station determining section 213 determines the local stations 20 to transmit the data channel and the control channel with the mobile terminal apparatus 10, based on the CSI information that is fed back later. The local station information related to the local stations whose CSI information is to be acquired, and the local station information related to the local stations that are determined as local stations 20 to transmit the data channel (control channel), are output to the control information generating section 201. The control information generating section 201 generates RRC CONNECTION RECONFIGURATION information containing the local station information.

The initial transmission power determining section 214 determines the initial transmission power (EPDCCH/PDSCH) for the local stations 20 based on the DISCOVERY SIGNAL measurement results (received signal power). The initial transmission power determining section 214 transmits initial transmission power command information to the local stations 20 to be the target of connection for the mobile terminal apparatus 10 via the transmission path interface 211.

Figure 6:
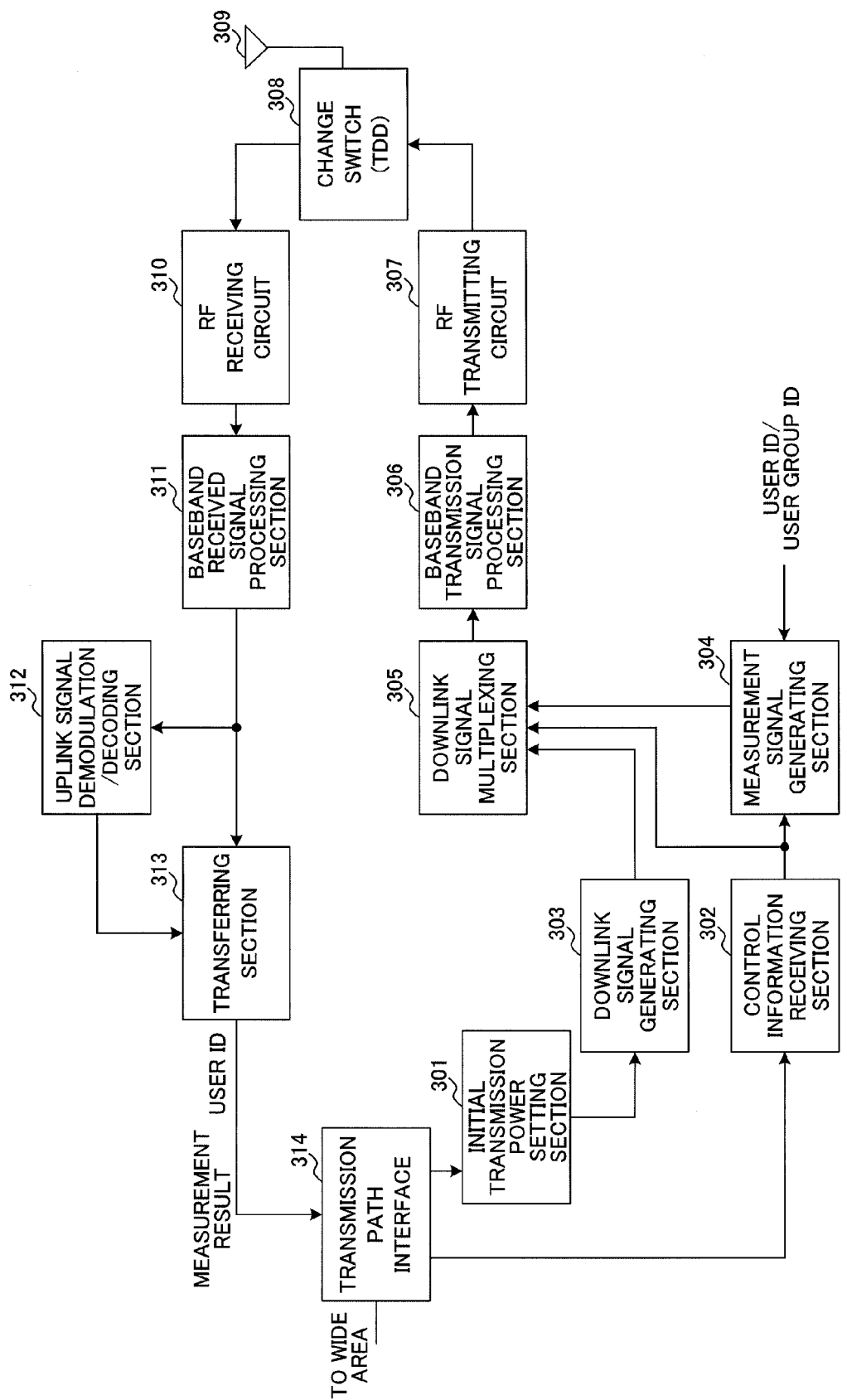
FIG. 6 is a diagram of an overall configuration of a local station.

An overall configuration of a local station 20 will be described with reference to FIG. 6. Assume that the local station 20 is placed very close to the mobile terminal apparatus 10. The local station 20 has an initial transmission power setting section 301 and a control information receiving section 302. The local station 20 has, as processing sections of the transmitting sequence, a downlink signal generating section 303, a measurement signal generating section 304, a downlink signal multiplexing section 305, a baseband transmission signal processing section 306, and an RF transmitting circuit 307.

The initial transmission power setting section 301 receives initial transmission power command information from the macro station 30 via the transmission path interface 314. The initial transmission power setting section 301 sets the initial transmission power of the downlink data signal (PDSCH) and the downlink control signal (EPDCCH), based on the initial transmission power command information.

The control information receiving section 302 receives the transmission control information for the measurement signals from the macro station 30 via the transmission path interface 314. For example, when the same signals as the PSS and the SSS are used as measurement signals, sequence information of the PSS and the SSS is used as transmission control information. When signals that are the same signal sequences as or different signal sequences from the PSS and the SSS and that are multiplexed in different locations along the time/frequency direction are used as measurement signals, the signal sequences of the PSS and the SSS and information about their multiplexing locations along the time/frequency direction are used as transmission control information. When small cell DISCOVERY SIGNALS are used as measurement signals, the parameters of the DISCOVERY SIGNALS such as the radio resources, signal sequences, carrier frequencies and bandwidths are used as transmission control information. When DM-RSs or CSI-RSs are used as a measurement signals, DM-RSs or CSI-RSs pseudo-random sequences or parameters related thereto—for example, scrambling identification information (SCID) or cell IDs (or user IDs in the event measurement signal parameters are associated with user IDs (or user group IDs))—are used as transmission control information. When measurement signals are generated in sequences based on small cell synchronization channels, for example, the parameters of small cell-specific DISCOVERY SIGNALS such as the radio resources, signal sequences, carrier frequencies and bandwidths are used as transmission control information. The control information receiving section 302 outputs the transmission control information to the measurement signal generating section 304.

When the measurement control information (measurement signal parameters) is sent to the mobile terminal apparatus 10 through higher layer signaling, the measurement signal generating section 304 generates measurement signals based on the transmission control information given from the control information receiving section 302.

In the event measurement signal parameters are associated with user IDs (or user group IDs), the measurement signal generating section 304 generates measurement signals as follows. When the same signals as the PSS and the SSS are used as measurement signals, signal sequences of the PSS and the SSS are generated based on the user IDs (or the user group IDs) assigned to the mobile terminal apparatus 10. When signals that are the same signal sequences as or different signal sequences from the PSS and the SSS, and that are multiplexed in different locations along the time/frequency direction are used as measurement signals, signal sequences of the PSS and the SSS are generated based on the user IDs (or the user group IDs), and also the multiplexing locations are controlled. In the event small cell DISCOVERY SIGNALS are used as measurement signals, the DISCOVERY SIGNALS are generated based on the DISCOV- ERY SIGNAL parameters (at least one of the radio resources, the signal sequence, the carrier frequency, and the bandwidth) associated with the user IDs (or user group IDs). When DM-RSs or CSI-RSs are used as measurement signals, DM-RSs or CSI-RSs are generated based on the DM-RS or CSI-RS parameters (pseudo-random sequences or parameters related thereto) associated with the user IDs (or the user group IDs).

In the event measurement signals are generated in sequences based on small cell synchronization channels, the measurement signal generating section 304 generates measurement signals as follows. The measurement signal generating section 304 generates small cell synchronization channels as measurement signals for measuring the RSRP and so on, and generates measurement signals based on sequences determined by the parameters of small cell synchronization channels as measurement signals for measuring CQIs and so on. In this case, the parameters of small cell-specific DISCOVERY SIGNALS such as the radio resources, signal sequences, carrier frequencies and bandwidths are given from the control information receiving section 302 to the measurement signal generating section 304. The measurement signal generating section 304 generates DISCOVERY SIGNALS based on parameter such as radio resources, signal sequences, carrier frequencies, bandwidths and so on. After that, when measurement signals for channel estimation are generated, CSI-RSs are scrambled with sequences determined by the DISCOVERY SIGNAL parameters (radio resources, signal sequences and so on). The CSI-RSs are output as measurement signals.

The downlink signal generating section 303 generates the downlink data signal (PDSCH), downlink reference signals, and the downlink control signal (EPDCCH). In relationship to this downlink signal generating section 303, the initial transmission power setting section 301 sets the initial transmission power of the downlink data signal and the downlink control signal.

The downlink signal multiplexing section 305 multiplexes the measurement signals, the downlink transmission data, the downlink reference signal, and the downlink control signal. When there is measurement control information, these signals are multiplexed over downlink signals of the small cells. A downlink signal for the mobile terminal apparatus 10 is input in the baseband transmission signal processing section 306, and subjected to digital signal processing. For example, in the event this is a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 307, and is transmitted from a transmitting/receiving antenna 309 via the change switch 308 that is provided between the transmitting sequence and the receiving sequence. A duplexer may be provided instead of the change switch 308.

The local station 20 has, as processing sections of the receiving sequence, an RF receiving circuit 310, a baseband received signal processing section 311, an uplink signal demodulation/decoding section 312, and a transferring section 313.

Uplink signals for the small cells from the mobile terminal apparatus 10 are received in the transmitting/receiving antenna 309 for the small cells, and input in the baseband received signal processing section 311 via the change switch 308 and RF receiving circuit 310. In the baseband received signal processing section 311, the uplink signals are subjected to digital signal processing. For example, in the event these are uplink signals of the OFDM scheme, the cyclic prefixes are removed, and the signals are converted from time sequence signals to frequency domain signals through a fast Fourier transform (FFT). The uplink data signal is input in the uplink signal demodulation/decoding section 312, and decoded (descrambled) and demodulated in the uplink signal demodulation/decoding section 312. When the mobile terminal apparatus 10 sends MEASUREMENT reports to the local station 20, the DISCOVERY SIGNAL MEASUREMENT reports are decoded from the uplink signal. When the mobile terminal apparatus 10 feeds back CSI information to the local stations 20, the CSI information is decoded from the uplink signal.

The transferring section 313 transfers the MEASUREMENT reports and the CSI information decoded from the uplink signal, to the macro station 30, via the transmission path interface 314. The MEASUREMENT reports are not transferred if the local stations 20 determine on their own the local stations whose CSI information will be fed back, based on the MEASUREMENT reports. Similarly, the CSI information is not transferred if the local stations 20 determine on their own the local stations to transmit the data channel and the control channel based on the CSI information.

When a local station 20 is determined by the macro station 30 to be a local station to transmit the data channel and the control channel, a command to transmit the data channel and the control channel with the mobile terminal apparatus 10 is reported via the transmission path interface 314.

Figure 7:
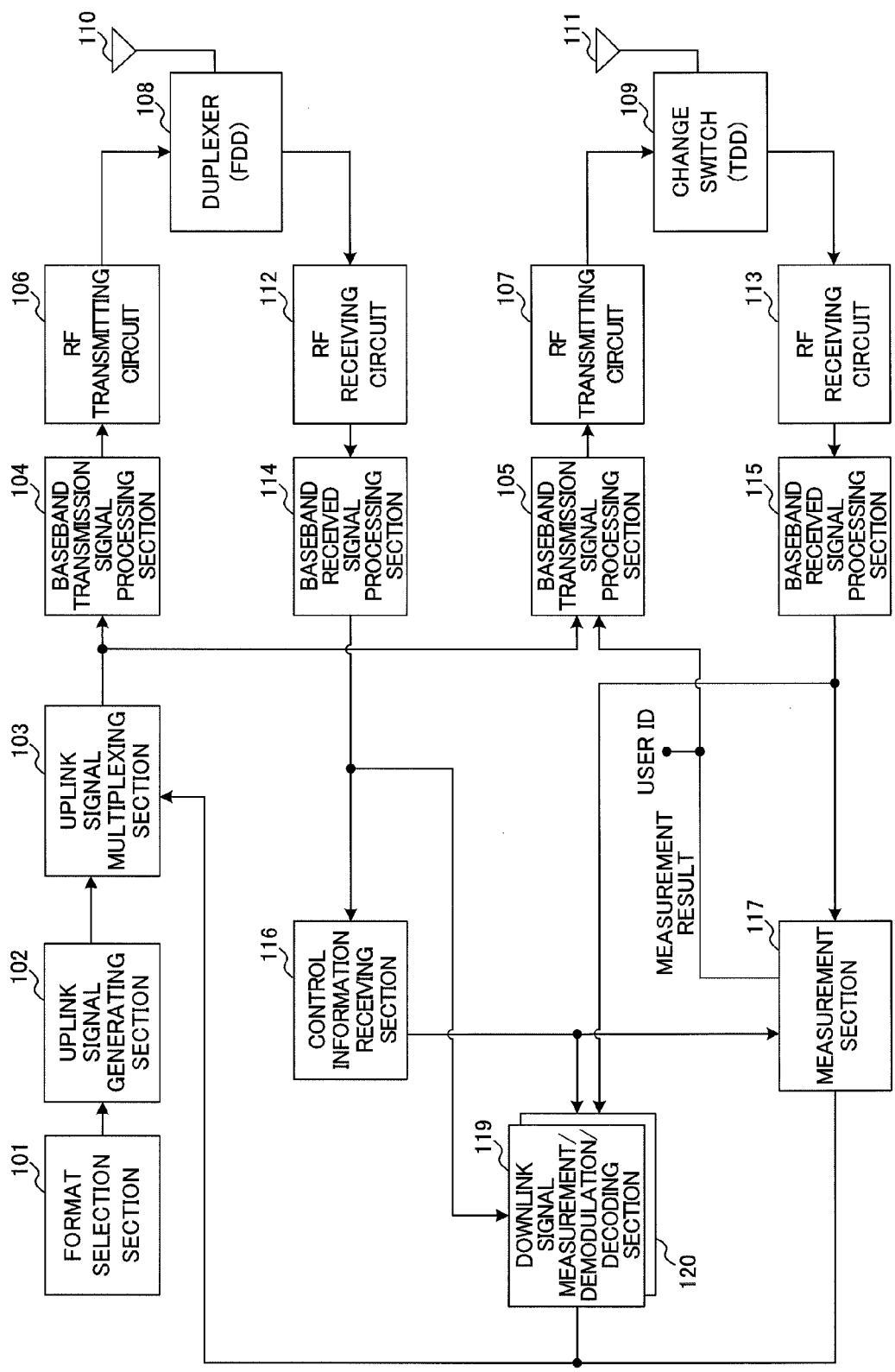
FIG. 7 is a diagram to show an overall configuration of a mobile terminal apparatus.

An overall configuration of the mobile terminal apparatuses 10 will be described with reference to FIG. 7. The mobile terminal apparatus 10 has, as processing sections of the transmitting sequence, a format selection section 101, an uplink signal generating section 102, an uplink signal multiplexing section 103, baseband transmission signal processing sections 104 and 105, and RF transmitting circuits 106 and 107.

The format selection section 101 selects the transmission format for the macro cell and the transmission format for the small cells. The uplink signal generating section 102 generates uplink data signals and reference signals. In the event of the transmission format for the macro cell, the uplink signal generating section 102 generates uplink data signals and reference signals for the macro station 30. In the event of the transmission format for the small cells, the uplink signal generating section 102 generates uplink data signals and reference signals for the local stations 20.

The uplink signal multiplexing section 103 multiplexes uplink transmission data and uplink reference signals as an uplink signal. The uplink signal multiplexing section 103 multiplexes MEASUREMENT reports, and CSI information acquired with respect to specific local stations, as an uplink signal. For example, when the macro station 30 is the recipient to which the MEASUREMENT reports and CSI information corresponding to the measurement results of measurement signals are to be reported, these uplink signals are input in the baseband transmission signal processing section 104. The uplink signals for the macro station 30 are input in the baseband transmission signal processing section 104, and subjected to digital signal processing. For example, in the event these are uplink signals of the OFDM scheme, the signals are converted from frequency domain signals into time sequence signals through an inverse fast Fourier transform (IFFT), and have cyclic prefixes inserted therein. Then, the uplink signals pass the RF transmitting circuit 106, and are transmitted from a transmitting/receiving antenna 110 for the macro cell, via a duplexer 108 that is provided between the transmitting sequence and the receiving sequence. In the transmitting/receiving sequences for the macro cell, simultaneous transmission/reception is made possible by the duplexer 108.

If the local stations 20 are the recipients to which the MEASUREMENT reports and CSI information corresponding to the measurement results of measurement signals are to be reported, these uplink signals are input in the baseband transmission signal processing section 105. The uplink signals for the local stations 20 are input in the baseband transmission signal processing section 105, and subjected to digital signal processing. For example, in the event these are uplink signals of the OFDM scheme, the signals are converted from frequency domain signals to time sequence signals through an inverse fast Fourier transform (IFFT), and have cyclic prefixes inserted therein. Then, the uplink signals pass the RF transmitting circuit 107, and are transmitted from a transmitting/receiving antenna 111 for the macro cell, via a change switch 109 that is provided between the transmitting sequence and the receiving sequence. In the transmitting/receiving sequences for the small cells, transmission and reception are switched by the change switch 109.

Although the present embodiment is configured so that the duplexer 108 is provided in the transmission/reception sequences for the macro cell and the change switch 109 is provided in the transmission/reception sequences for the small cells, this configuration is by no means limiting. It is equally possible to provide the change switch 109 in the transmission/reception sequences for the macro cell, or provide the duplexer 108 in the transmission/reception sequences for the small cells. Uplink signals for the macro cell and the small cells may be transmitted simultaneously from the transmitting/receiving antennas 110 and 111, or may be transmitted separately by switching between the transmitting/receiving antennas 110 and 111.

The mobile terminal apparatus 10 has, as processing sections of the receiving sequence, RF receiving circuits 112 and 113, baseband received signal processing sections 114 and 115, a control information receiving section 116, a measurement section 117, and downlink signal demodulation/decoding sections 119 and 120.

A downlink signal from the macro station 30 is received in the transmitting/receiving antenna 110 for the macro cell. This downlink signal is input in the baseband received signal processing section 114 via the duplexer 108 and the RF receiving circuit 112, and subjected to digital signal processing. For example, in the event this is a downlink signal of the OFDM scheme, the cyclic prefixes are removed, and the signal is converted from a time sequence signal to a frequency domain signal through a fast Fourier transform (FFT).

The control information receiving section 116 receives various kinds of control information from the macro cell downlink signal. When the macro station 30 reports the parameters of measurement signals by higher layer signaling, the measurement signal parameters are detected as measurement control information. For example, when the same signals as the PSS and the SSS are used as measurement signals, signal sequences of the PSS and the SSS are detected as measurement control information. When signals that are the same signal sequences as or different signal sequences from the PSS and the SSS and that are multiplexed in different locations along the time/frequency direction are used as measurement signals, signal sequences of the PSS and the SSS and information about their multiplexing positions along the time/frequency direction are detected as measurement control information. When small cell DISCOVERY SIGNALS are used as measurement signals, the parameters of the DISCOVERY SIGNALS such as the radio resources, signal sequences, carrier frequencies and bandwidths are detected as measurement control information. When DM-RSs or CSI-RSs are used as measurement signals, the DM-RS or CSI-RS pseudo-random sequences and parameters related thereto—for example, parameters related to scrambling identification information (SCID) and cell IDs—are detected as measurement control information.

When small cell-specific DISCOVERY SIGNALS are used as small cell synchronization channels, the control information receiving section 116 detects the parameters of the DISCOVERY SIGNALS such as the radio resources, signal sequences, carrier frequencies, bandwidths and so on as measurement control information. The control information receiving section 116 outputs the measurement control information to the measurement section 117. A downlink data signal of the macro cell is input in the downlink signal demodulation/decoding section 119, and decoded (descrambled) and demodulated in the downlink signal demodulation/decoding section 119.

Downlink signals from the local stations 20 are received in the transmitting/receiving antenna 111 for the small cells. The downlink signals are input in the baseband received signal processing section 115 via the change switch 109 and the RF receiving circuit 113, and are subjected to digital signal processing. For example, in the event these are downlink signals of the OFDM scheme, the cyclic prefixes are removed, and the signals are converted from time sequence signals to frequency domain signals through a fast Fourier transform (FFT).

The measurement section 117 measures the RSRP, CQIs and so on with respect to the measurement signals from the local stations 20 based on the measurement control information input from the control information receiving section 116. The measurement section 117 can make the RSRP, RSRQ or RSSI the object of MEASUREMENT with respect to the measurement signals of each local station 20. The measurement section 117 can make the CQIs, PMIs and RIs the object of MEASUREMENT with respect to the measurement signals of each local station 20.

For example, when measurement control information is reported through higher layer signaling, the signal sequences and radio resources of the measurement signals are specified and measurements are carried out as follows. When the same signals as the PSS and the SSS are used as measurement signals, the measurement section 117 specifies the measurement signals based on the signal sequences of the PSS and the SSS detected as measurement control information, and measures the RSRP, CQIs and so on. When signals that are the same signal sequences as or different signal sequences from the PSS and the SSS and that are multiplexed in different locations along the time/frequency direction are used as measurement signals, the measurement section 117 specifies the measurement signals based on the signal sequences of the PSS and the SSS detected as measurement control information and information about their multiplexing locations along the time/frequency direction, and measures the RSRP, CQIs and so on. When small cell DISCOVERY SIGNALS are used as measurement signals, the measurement section 117 specifies the DISCOVERY SIGNALS based on the parameters of the DISCOVERY SIGNALS such as the radio resources, signal sequences, carrier frequencies, bandwidths and so on, and measures the RSRP, CQIs and so on. When DM-RSs or CSI-RSs are used as measurement signals, the measurement section 117 specifies the DM-RSs or CSI-RSs based on the DM-RS or CSI-RS pseudo random sequences detected as measurement control information, or parameters related thereto—for example, parameters related to scrambling identification information (SCID) and cell IDs—and measures the RSRP, CQIs and so on.

In the event measurement signal parameters are associated with user IDs (or user group IDs), the signal sequences and radio resources of the measurement signals are specified and measurements are carried out as follows. When the same signals as the PSS and the SSS are used as measurement signals, the measurement section 117 specifies the signal sequences of the PSS and the SSS based on the user IDs (or the user group IDs) assigned to the mobile terminal apparatus 10, and measure the RSRP, CQIs and so on of the PSS and the SSS based on the specified signal sequences. When signals that are the same signal sequences as or different signal sequences from the PSS and the SSS and that are multiplexed in different locations along the time/frequency direction are used as measurement signals, the measurement section 117 specifies the signal sequences of the PSS and the SSS and their multiplexing locations based on the user IDs (or user group IDs), and measures the RSRP, CQIs and so on of the measurement signals based on the specified signal sequences and multiplexing locations. When small cell DISCOVERY SIGNALS are used as measurement signals, the measurement section 117 specifies the parameters of the DISCOVERY SIGNALS such as the radio resources, signal sequences, carrier frequencies, bandwidths and so on based on the user IDs (or the user group IDs), and measures the RSRP, CQIs and so on of the DISCOVERY SIGNAL based on the specified DISCOVERY SIGNAL parameters such as the radio resources, signal sequences, carrier frequencies, bandwidths and so on. When DM-RSs or CSI-RSs are used as measurement signals, the measurement section 117 specifies the DM-RS or CSI-RS pseudo random sequences based on the user IDs (or the user group IDs) and parameters related thereto—for example, parameters related to scrambling identification information (SCID) and cell IDs—and measures the RSRP, CQIs and so on of the DM-RSs or CSI-RSs based on the specified parameters.

When measurement signals are generated in sequences based on small cell synchronization channels, the signal sequences and radio resources of the measurement signals are specified and measurements are carried out as follows. The small cell synchronization channels are used as measurement signals for measuring the RSRP and so on, and signal that are generated based on sequences determined by the parameters of the small cell synchronization channels are used as measurement signals for measuring CQIs and so on. In this case, the parameters of small cell-specific DISCOVERY SIGNALS such as the radio resources, signal sequences, carrier frequencies, bandwidths and so on are given from the control information receiving section 116 to the measurement section 117 as measurement control signals. The measurement section 117 specifies the sequences to scramble CSI-RSs with, from the sequences determined by the parameters of the DISCOVERY SIGNALS (radio resources, signal sequences and so on), and measures the CQIs of the CSI-RSs as measurement signals based on the specified sequence information. That is, it is possible to identify the parameters of the measurement signals for measuring CQIs without having these reported from base stations, and therefore reduce signaling.

The measurement section 117 transmits the measurement results of the measurement signals (MEASUREMENT reports and CSI information) from each local station 20 to the macro station 30.

A downlink data signal of the small cells is input in a downlink signal demodulation/decoding section 120, and decoded (descrambled) and demodulated in the downlink signal demodulation/decoding section 120. The downlink signal demodulation/decoding section 120 decodes (descrambles) and demodulates the small cell downlink control signal (EPDCCH) based on the EPDCCH reception control information input from the control information receiving section 116. The EPDCCH reception control information includes, for example, radio resource information and DM-RS sequence information for reception from the local stations 20 by means of the EPDCCH. The radio resource information includes, for example, the transmission interval, the frequency location, and the code of the EPDCCH.

Downlink signals of the macro cell and the small cells may be received simultaneously from the transmitting/receiving antennas 110 and 111, or may be received separately by switching between the transmitting/receiving antennas 110 and 111.

As described above, with the radio communication system 1 according to the present embodiment, it is possible to generate measurement signals in local stations 20 based on arbitrary specifying information, and, since the specifying information, from which the measurement signals are generated in sequences, is reported to a mobile terminal apparatus 10 by means of higher layer signaling or broadcast signals, it is possible to receive and measure even small cell-specific measurement signals in the mobile terminal apparatus 10.

With the radio communication system 1 according to the present embodiment, signal sequences of measurement signals are generated in accordance with parameters linked with user IDs or user group IDs, so that, compared to signal sequences linked with cell IDs, it is possible to generate signal sequences of measurement signals without being limited to cell IDs. The mobile terminal apparatus 10 is able to specify and measure even small cell-specific measurement signals based on the user IDs or the user group IDs with which the mobile terminal apparatus 10 is identified.

With the radio communication system 1 according to the present embodiment, measurement signals for channel state measurements are generated based on sequence information of small cell synchronization channels, so that it is possible to reduce the signaling of control information related to measurement signals for measuring channel states.

The present invention is by no means limited to the above embodiment and can be implemented in various modifications. For example, it is possible to change the number of carriers, the carrier bandwidth, the signaling method, the number of processing sections and the order of processing steps in the above description as appropriate, and still implement the present invention without departing from the scope of the present invention. Besides, the present invention can be implemented with various changes, without departing from the scope of the present invention.

The disclosure of Japanese Patent Application No. 2012-170257, filed on Jul. 31, 2012, including the specification, drawings, and abstract, is incorporated herein by reference in its entirety.

The invention claimed is:

1. A communication system comprising a macro base station apparatus that forms a macro cell, a plurality of local base station apparatuses that are connected with the macro base station apparatus via a communication link and that form small cells in the macro cell, and a mobile terminal apparatus that can communicate with the macro base station apparatus using a radio communication scheme for the macro cell, and that can communicate with each local base station apparatus using a radio communication scheme for the small cells, wherein:

the local base station apparatuses comprise:
- a generating section that generates measurement signals that are used in measurements in the mobile terminal apparatus, based on user identifiers; and
- a transmission section that transmits the generated measurement signals to the mobile terminal apparatus; and the mobile terminal apparatus comprises:
- a receiving section that receives the measurement signals transmitted from the local base station apparatuses; and
- a measurement section that specifies and measures the measurement signals based on the user identifiers, wherein the measurement signals comprise signal sequences that vary depending on the user identifiers, and the measurement signals comprises:
- signal sequences that are same as or different from synchronization signals defined in LTE Release 10 and that are multiplexed in different time and frequency locations from the synchronization signals, wherein at least the multiplexing locations or the sequences vary depending on the user identifiers;
- small cell-specific detection signals for detecting the local base station apparatuses in the mobile terminal apparatus, wherein at least signal sequences of the detection signals vary depending on the user identifiers; or
- signals that are same signal sequences as reference signals defined in LTE Release 10 or part of the reference signals, wherein signal sequences of the reference signals or signal sequences of part of the reference signals vary depending on the user identifiers.

2. The communication system according to claim 1, wherein the measurement signals comprise signals of same signal sequences as synchronization signals defined in LTE Release 10, and signal sequences of the synchronization signals vary depending on the user identifiers.

3. A base station apparatus that constitutes a local base station apparatus in a communication system comprising a macro base station apparatus that forms a macro cell, a plurality of local base station apparatuses that are connected with the macro base station apparatus via a communication link and that form small cells in the macro cell, and a mobile terminal apparatus that can communicate with the macro base station apparatus using a radio communication scheme for the macro cell, and that can communicate with each local base station apparatus using a radio communication scheme for the small cells, the base station apparatus comprising:

a generating section that generates measurement signals that are used in measurements in the mobile terminal apparatus, based on user identifiers; and
a transmission section that transmits the generated measurement signals to the mobile terminal apparatus,
wherein the measurement signals comprise signal sequences that vary depending on the user identifiers, and
the measurement signals comprises:
- signal sequences that are same as or different from synchronization signals defined in LTE Release 10 and that are multiplexed in different time and frequency locations from the synchronization signals, wherein at least the multiplexing locations or the sequences vary depending on the user identifiers;
- small cell-specific detection signals for detecting the local base station apparatuses in the mobile terminal apparatus, wherein at least signal sequences of the detection signals vary depending on the user identifiers; or
- signals that are same signal sequences as reference signals defined in LTE Release 10 or part of the reference signals, wherein signal sequences of the reference signals or signal sequences of part of the reference signals vary depending on the user identifiers.

4. A mobile terminal apparatus that communicates with a macro base station apparatus forming a macro cell, using a radio communication scheme for the macro cell, and that communicates with a plurality of local base station apparatuses that are connected with the macro base station apparatus via a communication link and that form small cells in the macro cell, using a radio communication scheme for the small cells, the mobile terminal apparatus comprising:

a receiving section that receives measurement signals transmitted from the local base station apparatuses; and
a measurement section that measures the measurement signals based on user identifiers,
wherein the measurement signals comprise signal sequences that vary depending on the user identifiers, and
the measurement signals comprises:
- signal sequences that are same as or different from synchronization signals defined in LTE Release 10 and that are multiplexed in different time and frequency locations from the synchronization signals, wherein at least the multiplexing locations or the sequences vary depending on the user identifiers;
- small cell-specific detection signals for detecting the local base station apparatuses in the mobile terminal apparatus, wherein at least signal sequences of the detection signals vary depending on the user identifiers; or
- signals that are same signal sequences as reference signals defined in LTE Release 10 or art of the reference signals, wherein signal sequences of the reference signals or signal sequences of part of the reference signals vary depending on the user identifiers.

5. A communication method in a communication system comprising a macro base station apparatus that forms a macro cell, a plurality of local base station apparatuses that are connected with the macro base station apparatus via a communication link and that form small cells in the macro cell, and a mobile terminal apparatus that can communicate with the macro base station apparatus using a radio communication scheme for the macro cell, and that can communicate with each local base station apparatus using a radio communication scheme for the small cells, the communication method comprising the steps in which:

the local base station apparatuses generate measurement signals that are used in measurements in the mobile terminal apparatus, based on user identifiers;
the local base station apparatuses transmit the generated measurement signals to the mobile terminal apparatus;
the mobile terminal apparatus receives the measurement signals transmitted from the local base station apparatuses; and
the mobile terminal apparatus specifies and measures the measurement signals based on the user identifiers, wherein the measurement signals comprise signal sequences that vary depending on the user identifiers, and the measurement signals comprises:
- signal sequences that are same as or different from synchronization signals defined in LTE Release 10 and that are multiplexed in different time and frequency locations from the synchronization signals, wherein at least the multiplexing locations or the sequences vary depending on the user identifiers;
- small cell-specific detection signals for detecting the local base station apparatuses in the mobile terminal apparatus, wherein at least signal sequences of the detection signals vary depending on the user identifiers: or
- signals that are same signal sequences as reference signals defined in LTE Release 10 or part of the reference signals, wherein signal sequences of the reference signals or signal sequences of part of the reference signals vary depending on the user identifiers.

* * * * *